United States Patent [19]

Thatcher

[11] 4,015,086

[45] Mar. 29, 1977

[54] HINGED WELDING MACHINE

[76] Inventor: Russell S. Thatcher, 813 Sidnor, Alvin, Tex. 77511

[22] Filed: Apr. 9, 1975

[21] Appl. No.: 566,252

[52] U.S. Cl. .................... 219/60 A; 219/125 R; 242/72 R; 279/2 R

[51] Int. Cl.² ........................................... B23K 9/02

[58] Field of Search .......... 219/60 A, 60 R, 125 R, 219/126; 242/46.4, 72 R; 279/2 R; 269/48.1

[56] References Cited

UNITED STATES PATENTS

| | | | |
|---|---|---|---|
| 1,612,988 | 1/1927 | Schulz | 242/72 R |
| 2,977,092 | 3/1961 | Duerksen | 242/72 R X |
| 3,135,850 | 6/1964 | Scheller et al. | 219/60 A |
| 3,220,629 | 11/1965 | Anderson | 219/125 R X |
| 3,800,116 | 3/1974 | Tanaka et al. | 219/125 R X |

*Primary Examiner*—J. V. Truhe
*Assistant Examiner*—N. D. Herkamp
*Attorney, Agent, or Firm*—Arnold, White & Durkee

[57] ABSTRACT

A traveling carriage is adapted to support and guide a welding head, a propelling apparatus, a wire feed mechanism and a reel for winding a continuous length of welding wire thereon. The welding unit is adapted to travel about an upstanding circumferential workpiece and is further adapted to be hingedly adjustable so as to permit adapting said welding unit to workpieces of varying diameters from a minimum practical dimension to an infinite diameter, that is, the welding machine can be adjusted to travel along a seam of two flat plates being joined. The welding unit has two spaced guide rollers on a side adjacent the work area with a hinge point spaced intermediate therebetween for changing from a working radius of the welder determined by the diameter of the workpiece to straight line configuration for performing a welding operation on a flat workpiece.

11 Claims, 9 Drawing Figures

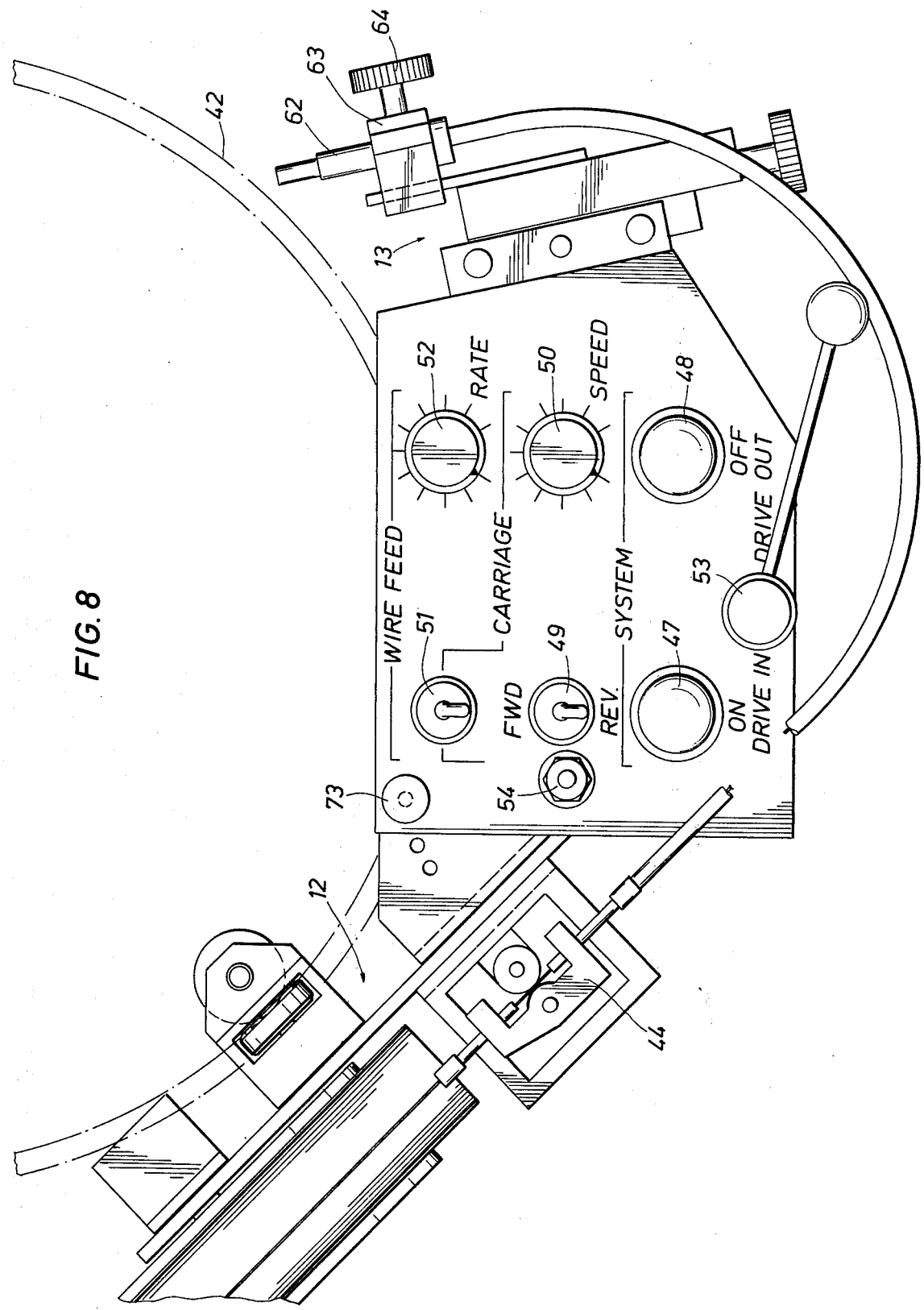

HINGED WELDING MACHINE

BACKGROUND OF THE INVENTION

There are a variety of orbital track-traveling carriage mechanisms for performing welding of pipe joints or other vertical cylindrical members such as steel pipe, piles or tanks.

In the application of utilizing a cylindrical pipe as a foundation pile for a structure such as an offshore drilling rig, the length of the steel pipe required will, of course, vary according to the depth of the water at the site location. In the instance of providing a foundation for a structure on land, the length of the pipe will vary according to the subsoil structural conditions. For the longer lengths of structural pipe, it is often convenient or necessary to reduce the diameter of the pipe as the pile is driven deeper into the ground. Or, it may be necessary to use different sized pilings for different support members of the same or closely adjacent structures. In such event, it is necessary to employ a number of different welding units, each adapted for a particular size of steel pipe. This difference between the various welding units requires a substantial increase in the logistical support for a welding operation in a remote area. For example, if there were three different sized pipes being used to fabricate pilings and a number of varying-sized welding machines required for the different sizes of pilings, it would be necessary to maintain an inventory of spare welding units and parts for welding units in substantially greater numbers than would be required if a standard welding unit were available.

A straight line application would be the welding of a horizontal seam on the side of a marine vessel.

An additional problem in the use of welding machines which are used for welding circumferential workpieces arises when there is a requirement for welding, for example, a horizontal seam on a vessel of large diameter or with flat surfaces. The conventional circumferential welder will not adapt to such use, requiring yet another type of welding machine to be maintained.

SUMMARY OF THE INVENTION

A welding machine for welding substantially vertically extending pipes or pilings in end-to-end relation: There is a plurality of roller assemblies having an adjustable effective radius for adapting the welding machine to circumferential workpieces of varying diameter or applications requiring the welding machine to be capable of traveling along a track of substantially straight-line configuration.

It is a feature of this invention to provide a welding machine adaptable to varying diameter workpieces.

It is another feature of this invention to provide a welding machine having means for carrying a propelling mechanism, a supply of welding wire and a torch adjustment mechanism for permitting multiplanar movement of an attached welding torch.

It is yet another feature of this invention to provide a welding machine having controllable driving means for propelling the welding machine about a circumferential track or straight track and providing a supply of welding wire to a welding torch.

It is yet another feature of this invention to provide a welding machine having locking and adjust cam mechanisms associated with the welding wire support mechanism for securing a welding wire spool on the support.

These and other features of this invention will become apparent to those skilled in the art in the following description of a preferred embodiment of my invention.

THE DRAWINGS

A welding machine for welding the butt ends of substantially vertically extending workpieces, constructed in accordance with the preferred embodiment of the invention, is illustrated in the accompanying drawings in which, FIG. 1 is a perspective view of a welding machine according to one preferred embodiment of the invention;

FIG. 8 is a plan view of the control panel of the central panel assembly.

DETAILED DESCRIPTION OF THE PREFERRED EMBODIMENT OF THE INVENTION

Figure 1:
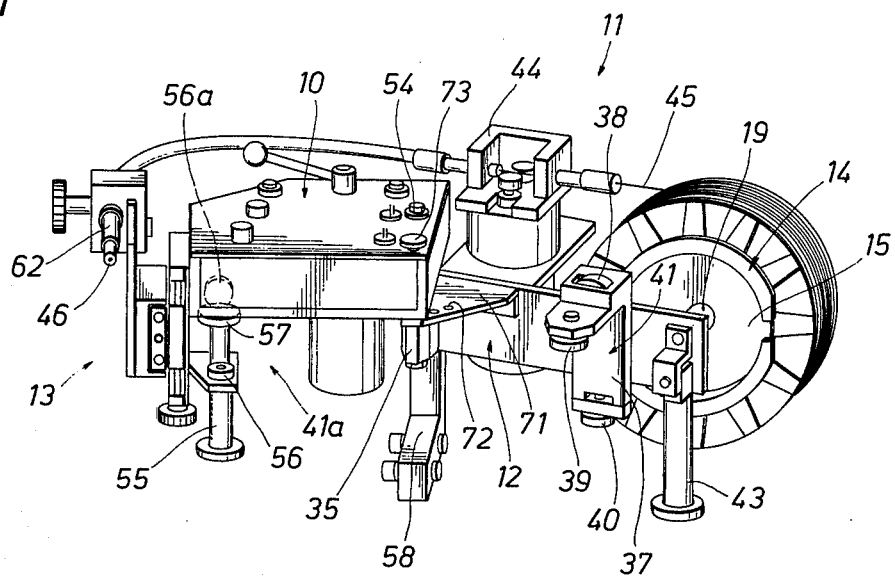

Referring to FIG. 1 of the drawings, a welding machine 11 constructed according to a preferred embodiment of the invention may be seen to comprise three main subassemblies; namely, the central panel assembly 10, the wire feed module assembly 12 and the torch adjustment mechanism 13.

The welding machine of the present invention is utilized to join by welding the butt ends of substantially vertically extending workpieces, such as piles, pipes, tanks or plates. In providing a foundation extending to a subsurface strata of a formation having a sufficient load bearing capacity, and where the depth of the strata exceeds 50 feet or so below the surface, it is common to utilize a plurality of pipes joined together at their butt ends by welding. For example, in providing a foundation for a large building, it may be necessary to drive a piling to 50–100 feet, and the joinder of two or more pipes may be required. Further, in providing a stable foundation platform for an oil derrick, it may be necessary to drive the piling through 100 feet or more of subsurface soil which will not support the weight of the derrick. As the terrain and subsurface strata characteristics change over the area, it may be desired to change the diameter of the piling used to support the structure. The joining of one piling to another in the vertical orientation is accomplished by welding the butt ends of the piling together, and where the welding is performed by an automatic welder, as the diameter of the pipe changes, it is necessary to change to a different welding machine having the proper working radius. Alternatively the welding operation may be accomplished by using the welding machine of this invention mounted on a circumferential track and band assembly, such as that disclosed in my U.S. Pat. No. 3,910,480.

Referring to FIG. 1, there is illustrated in perspective view a welding machine 11 constructed in accordance with the present invention, and which includes the previously mentioned central panel assembly 10, wire feed module assembly 12 and torch adjustment mechanism 13.

Figure 2:
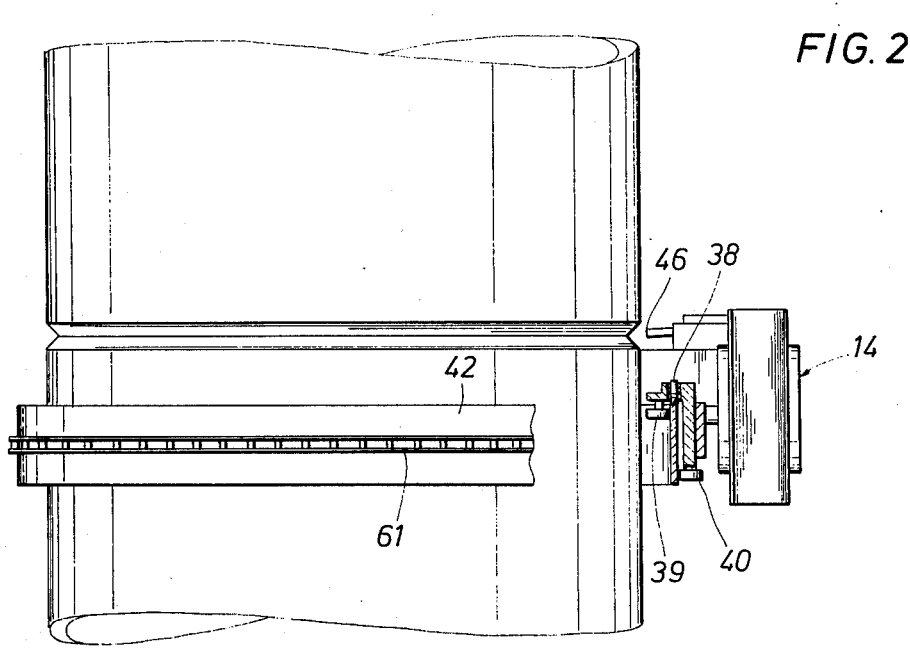
FIG. 2 is a view of the welding machine adjacent a vertical workpiece in preparation for welding a seam formed at the butt ends of two pipes.

The welding machine 11 is for use in the aforementioned process of joining the butt ends of pipes or pilings, and may be supported adjacent the weld location by a track circumferentially positioned about the workpiece, or against the side of a standing plate. As illustrated in FIG. 1, welding machine 11 is in the vertical or preferred orientation, and is supported about said workpiece by roller assemblies 41 and 41a. Rollers 40 and 39 of roller assembly 41 engage the outside and inside surfaces respectively of a track about the workpiece, with roller assembly 41a, and rollers 57, providing the remaining support and functioning similarly. The positioning of the welding machine on a track which supports the welding machine adjacent the work location is shown in FIG. 2. A circumferential workpiece is shown, although it readily will be appreciated that welding machine 11 is adaptable to welding a seam between two flat plates while being supported on a straight track assembly.

Figure 4:
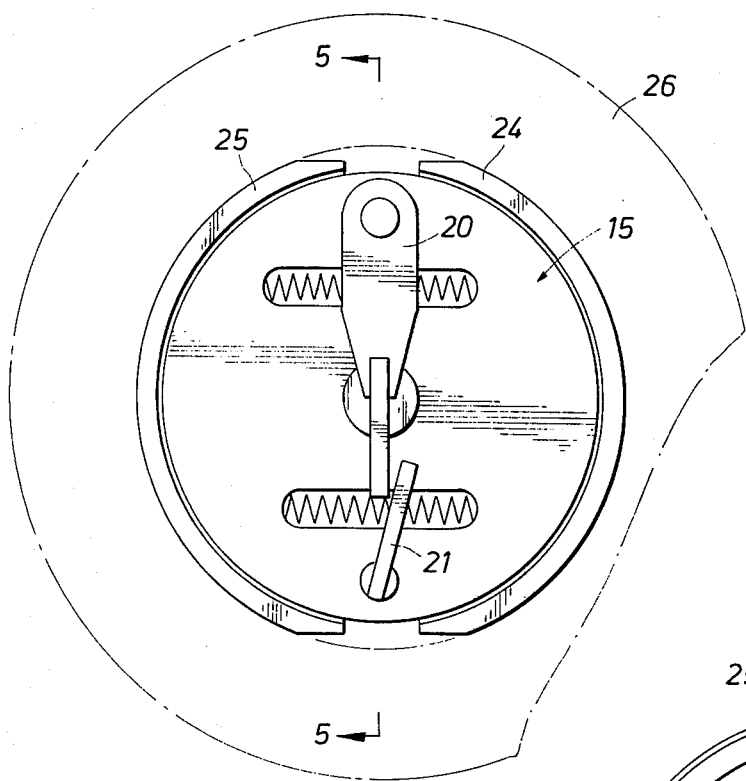
FIG. 4 is a side view of the wire spool, showing the locking and adjusting cams of the hub assembly which contains the supply of welding wire.
Figure 5:
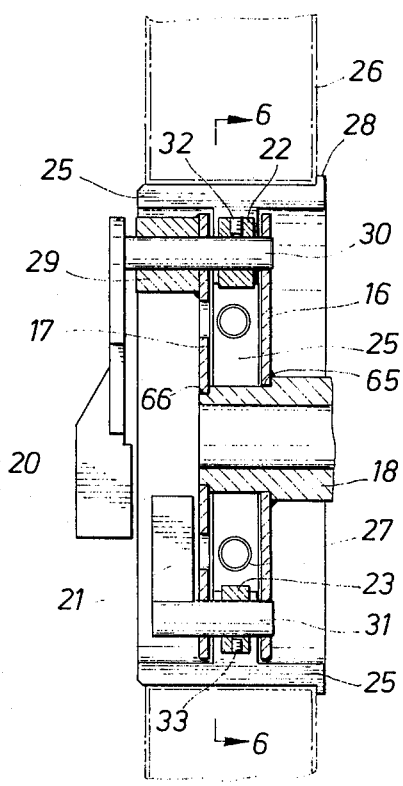
FIG. 5 is a side view of the hub assembly of FIG. 4 taken along line 5—5 of FIG. 4.
Figure 6:
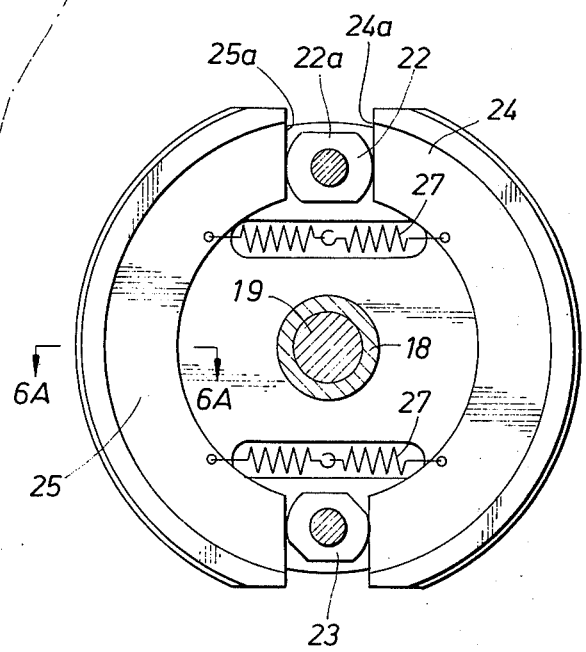
FIG. 6 is a view of a portion of the hub assembly of FIG. 4 taken along line 6—6 of FIG. 5.

Now viewing the various components which in combination comprise the welding machine, wire spool assembly 14 is further illustrated in FIGS. 4, 5 and 6. FIG. 4 is a view from the opposite side of wire spool assembly 14 as illustrated in FIG. 1. Depicted therein is central hub assembly 15 about which a wire reel 26, containing a supply of welding wire, may be mounted for use with welding machine 11. Hub assembly 15 is formed of inner plate 16, outer plate 17 and hub 18, the inner and outer plates 16 and 17 being joined to hub 18 by welding or other suitable means at the graduated steps of the hub at 65 and 66. Hub 18 is sized and adapted to engage shaft 19 (FIG. 1) where it may be locked into place by a suitable set screw or key mechanism.

Figure 6A:
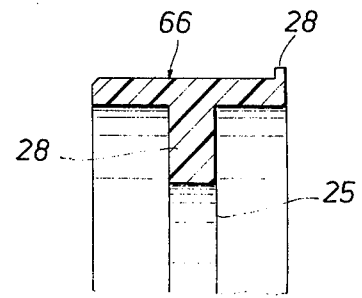
FIG. 6A is a cross-sectional view of a wire spool shoe, taken along line 6A—6A of FIG. 6.

There is further illustrated in FIG. 5 lock handle 20 and adjust handle 21. Lock handle 20 is pinned to shaft 30, on which is mounted cam 22. Similarly adjust handle 21 is affixed to cam 23 through shaft 31. There is provided a plurality of holes through inner and outer plates 16 and 17 for receiving shafts 30 and 31. Referring to FIG. 6, cams 22 and 23 are disposed adjacent and in contact with wire spool shoes 24 and 25. Referring briefly to FIG. 6A, a cross-sectional view of wire spool shoe 25 taken along lines 6A—6A of FIG. 6 is illustrated. Wire spool shoes 24, 25 form a circumferential surface for receiving wire reel 26, which circumferential surface will be referred to as the wire spool. Shown are circumferential surface 66, lip 28 and web 67. The orientation of the wire spool shoes with reference to hub assembly 15 is illustrated in FIG. 5 wherein wire spool shoe 25 ia shown. Shoe 25 is inserted into hub assembly 15 in the recess between inner and outer plates 16 and 17, the fit of said shoe providing sufficient clearance for movement of shoe 25 with respect to hub assembly 15. Referring to FIG. 6, the respective wire spool shoes are held in engagement with cams 22 and 23 by springs 27. As illustrated in FIGS. 4 and 5, wire reel 26 fits about wire spool shoes 24 and 25. Thus, for mounting a wire reel on wire spool assembly 14, it is only necessary to slide the reel over the exterior circumferential surface formed by wire spool shoes 24 and 25. The locking and adjusting cams 22 and 23 are provided for increasing the frictional engagement between the interior surface of wire reel 26 and the exterior or circumferential surface of wire spool shoes 25 and 24. When mounting a wire reel, handle 20 is rotated to bring locking cam 22 to its position of minimum diametral measurement, that being with the flats 22a of locking cam 22 in position to engage the radial end surfaces 24a and 25a of the respective wire spool shoes. This positioning of locking cam 22 then provides the circumferential surface of the wire spool shoes to be in a configuration of minimum diameter. Wire reel 26 is then mounted upon hub assembly 15 by sliding it over the wire spool 14 until there is engagement between the vertical surface of the wire reel 26 and lip 28. At this juncture, the lock handle 20 is rotated 90° or thereabouts, in order to cause wire spool shoes 24 and 25 to be circumferentially expanded, thereby increasing the effective diameter of the wire spool shoes and causing firm engagement between said wire spool shoes 24 and 25 and wire reel 26. To accomodate greater variations in the diameter of the wire reels, there is provided adjusting cams 23, actuated by rotating handle 21. As depicted in FIG. 6, there may be a plurality of flats cut onto the circumferential surface side of cam 23, each set of parallel flats having a different distance therebetween. Thus, rotation of adjust handle 21 and thereby cam 23 provides for an additional adjustment of the diameter of wire spool shoes 24 and 25.

As previously mentioned, there are provided apertures through inner and outer plates 16 and 17 of hub assembly 15 for receiving lock and adjust handles 20 and 21, as well as for providing stability thereto. There is further provided bearing 29, which is affixed to outer plate 17 and through which shaft 30 of lock handle 20 is bearingly mounted. Bearing 29 provides additional stability for the lock mechanism, permitting a greater force to be transmitted to cam 23 for locking shoes 24 and 25 within wire reel 26. Bearing 29 may be affixed to outer plate 17 of the hub assembly through any suitable means, but is preferably welded. Cams 22 and 23 are maintained in fixed relation to shafts 30 and 31 of the respective handles by use of set screws 32 and 33.

Figure 3:
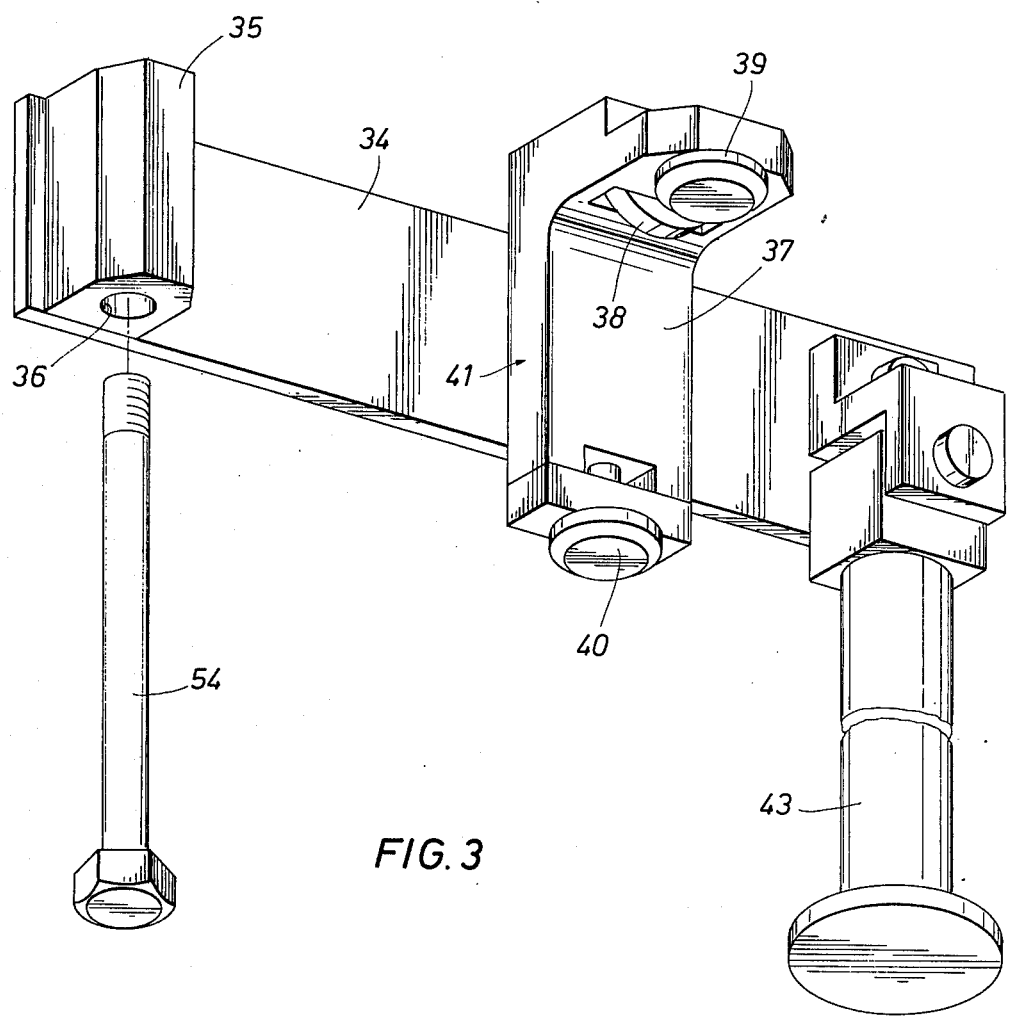
FIG. 3 is a perspective view of a portion of the wire feed module frame illustrated in FIG. 1, particularly illustrating the roller assembly for attaching the welding machine to a track supported about the workpiece.

Now referring to FIG. 3, a portion of wire feed module assembly 12 is illustrated in perspective view. Main frame 34 of wire feed module assembly 12 has affixed thereto, preferably by welding, bracket 35 through which is provided a bolt-receiving aperture 36. Bracket 35 provides the mounting point for hingedly affixing wire feed module assembly 12 to central panel assembly 10 (FIG. 1). Further, mounted on main frame 34 is roller attachment 37. Roller attachment 37 is affixed to main frame 34 by bolts or other suitable attaching devices, and provides support for the various rollers of roller assembly 41. Affixed to roller attachment 37 are rollers 38, 39 and 40. Referring briefly to FIG. 2, the disposition of the respective rollers is illustrated with respect to the carriage track and circumferential band assembly 42. The group of rollers 38, 39 and 40 together with roller attachment 37 will be referred to collectively as the roller assembly 41. There are provided a plurality of roller assemblies for supporting the welding machine 11 upon the circumferential track and band assembly 42, facilitating the rollers engaging the track of band assembly 42 at different locations about the circumference of the workpiece thereby providing a high degree of stability. In the embodiment illustrated there are two roller assemblies, one disposed on each side of the joinder point between the articulated halves of the welding machine. Of course, it would be within the purview of this invention to provide two joinder points and three roller assemblies for supporting the articulated sections of such a welding machine in an application requiring additional support. Referring again to FIG. 2, roller 39 extends a sufficient lateral distance over the lip of band assembly 42 to engage the inner surface of the band, the area of the band engaged by roller assembly 41 being generally referred to as the track. Roller 38 rests upon the upper or horizontal surface of the band assembly 42 and provides for rolling contact between that portion of roller assembly 41 (roller 38) which supports the vertical component of the weight of welding machine 11 and band assembly 42. Roller 40, being horizontally disposed, engages the outer surface of band assembly 42 adjacent the lower edge thereof, the three rollers 38, 39 and 40 providing support and rolling engagement between the track of assembly 42 and welding machine 11.

Referring again to FIG. 3, the details of the roller attachment 37 and roller assembly 41 are illustrated. Again, roller 39 engages the inner surface of band assembly 42, roller 40 engages the outer surface of band assembly 42 and roller 38 engages the upper or horizontal surface of the edge of the band. Mounting post 43 is provided as a part of wire module assembly 12 in order that the welding machine may, when not in use, rest thereon in upright position.

Now turning to FIG. 1, supported by wire feed module assembly 12 is wire feed mechanism 44 and associated drive means, for providing a supply of welding wire 45 to welding torch 62. The feed mechanism may be any type well known in the industry, such as, for example, devices comprising a gear motor driving a notched pair of knurled drive rollers which in turn pull the welding wire from the reel and push it through a guide tube to the torch 62.

Also depicted in FIG. 1 is central panel assembly 10 which contains the electrical controls and propelling mechanism for controlling the speed and direction of the welding machine 11 about the band assembly 42 and controlling rate of feeding welding wire to the welding torch through feed mechanism 44. As illustrated in FIG. 8, the control panel permits control of the principal functions of the welding machine. Included are master on and off switches 47 and 48 respectively, which control the electrical power to the motor for driving the carriage about the circumferential band assembly. Switch 49 permits reversing of the direction of the motor powering the carriage and has associated therewith an adjustable potentiometer 50 for controlling the speed of the carriage. Switch 51 is used in conjunction with a potentiometer 52 in controlling the speed of linear travel of welding wire through wire feed mechanism 44. Further, there is provided control 53 for moving a motor driven sprocket support assembly (not shown in FIG. 3) into or out of engagement with a roller chain 61 (FIG. 2) attached to the outer surface of the circumferential band assembly 42. The joinder of wire feed module assembly 12 with central panel assembly 10 is accomplished, as previously mentioned, through a bracket 35 by inserting bolt 54 through the central panel assembly 10 and aperture 37 of bracket 35 (FIG. 3) of the wire feed module assembly 12. The bracket 35 provides for pivoting of the articulated halves of the welding machine with respect to each other, thereby changing the effective radius of the arc circumscribed between roller assemblies 41 and 41a.

Figure 7:
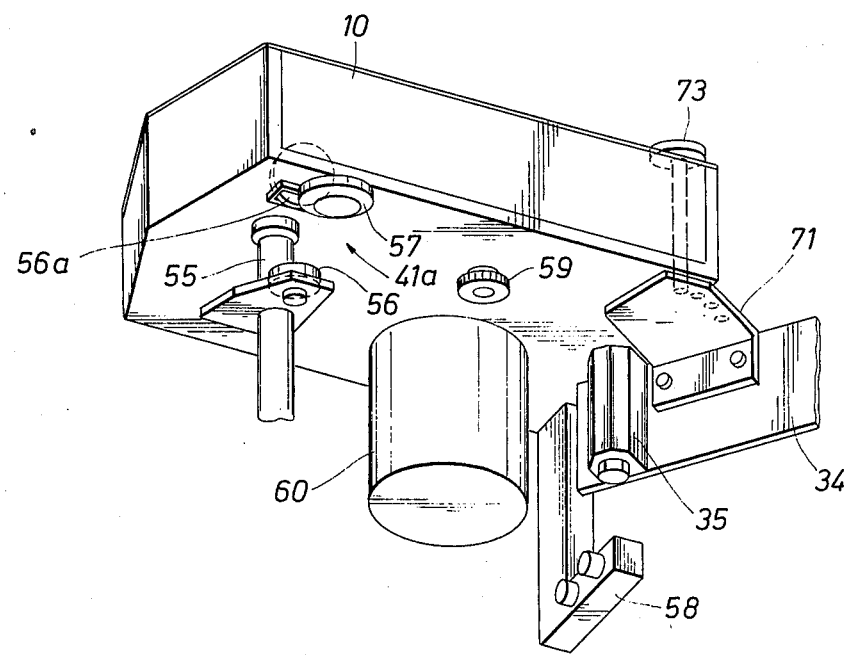
FIG. 7 is a perspective view of the central panel assembly generally illustrated in FIG. 1.

Referring again to FIG. 1, the remaining details of the central panel assembly 10 are illustrated. On the underside thereof, and adjacent the pipe to be welded, is roller mounting post 55. Post 55 serves a dual function of providing a support stand for welding machine 11 when not in position for welding, while also providing a support for roller 56. Roller 56 corresponds in function to roller 40 of roller assembly 41 and engages the exterior surface of the band. Associated with roller 56 is roller 57, which corresponds in function to roller 39 of roller assembly 41. Roller 57 is attached directly to the underside of the horizontal lower member of central panel assembly 10 and engages the inner surface of band assembly 42. There is also provided as a part of roller assembly 41a roller 56a (shown more completely in FIG. 7), which functions to engage the upper surface of the track similar to roller 38 of roller assembly 41. Rollers 56, 56a and 57, forming roller assembly 41a, cooperate with roller assembly 41 to support welding machine 11 on the circumferential band assembly. The location and function of the upper and lower rollers may be further understood with reference to FIG. 7, wherein a portion of the central frame assembly and wire frame module assembly 12 are illustrated. Therein are shown rollers 56, 56a and 57, with roller 57 being mounted directly to central panel assembly 10, roller 56 being mounted to roller mounting post 55 and roller 56a being carried by a support within central panel assembly 10. There is further illustrated in FIG. 7 connector bracket 58, which provides a connection point for a power cord to be attached to the power supply receptacles of the motor associated with the wire feed mechanism and the motor 60 associated with the drive sprocket 59. There is further provided control 53 for moving sprocket 59 into or out of engagement with the drive chain 61 (FIG. 2) associated with track and band assembly 42. The sprocket drive mechanism is interlinked to control 53 through a conventional eccentric cam arrangement.

Referring once again to FIG. 8, there is shown welding torch 62 mounted in a bracket 63 having a tightening means such as wheel 64 and screw shaft 68 for tightening bracket 63 about welding torch 62 and holding the same in place. The welding torch and bracket assembly are mounted on a torch adjustment mechanism 13 for providing vertical and horizontal linear displacement of the welding torch with respect to the seam being joined. The adjustment mechanism 13, not forming a part of this invention per se, may be any conventional bracket adjustable by means of a screw shaft which is manually adjustable. There would be provided, for example, two screw shafts between the central panel assembly 10 and the welding torch 62, one oriented in the vertical direction, the other being oriented in the horizontal direction for providing precise adjustment of the location of welding torch 62 with relation to the seam being welded.

Referring now to FIG. 1, welding machine 11 is arranged for adjustability of the effective radius of the rollers which support the welding machine about a circumferential track and band assembly or a straight track. This radius may be changed for adapting the welding machine to a variety of different-diametered pipes or pilings being welded together at their butt ends. For example, when it is desired to change the effective radius of the support roller assemblies, it is only necessary to loosen bolt 54, pivot wire feed module assembly 12 with respect to central panel assembly 10, mount welding machine 11 upon the band assembly and re-tighten bolt 54. The effective radius to which the roller assemblies may be adjusted of course depends upon the linear distance between roller assembly 41 and roller mounting post 55 as determined by the dimensions of wire frame assembly 12 and central panel assembly 10. In the embodiment illustrated in FIG. 1, there is provided gusset 71 attached to frame 34 of wire feed module assembly 12, gusset 71 having detents 72 spaced therein for receiving a pin 73 spring-tensioned through central panel assembly 10. When adjusting the working radius of the welding machine, bolt 54 is loosened, pin 73 raised from its detent 72 in gusset 71 and the articulated wire feed module assembly rotated to bring pin 71 into alignment with the detent 72 corresponding to the desired working radius of the roller assemblies 41 and 41a.

Thus, it is apparent that there has been provided, in accordance with the invention, a welding machine that substantially satisfies the features and advantages set forth above. Although the present invention has been described in conjunction with specific forms thereof, it is evident that many alternatives, modifications, and variations will be apparent to those skilled in the art in light of the foregoing disclosure of the invention. Accordingly, it is intended that all such alternatives, modifications, and variations which fall within the spirit and scope of the invention as defined in the appended claims be embraced thereby.

I claim:

1. A welding machine assembly for joining the abutting ends of substantially vertically extending workpieces in end-to-end relation, comprising:
    a central panel assembly including means for supporting a welding torch proximate a work area;
    a wire feed module assembly hingedly connected to and adjacent said central panel assembly, said wire feed module assembly being adapted to support a wire spool and reel having welding wire stored thereon;
    a first roller assembly affixed to said wire feed module assembly for engaging a track mounted proximate a substantially vertically extending workpiece or pipe section and adjacent the work area;
    a second roller assembly affixed to said central panel assembly for engaging said track, said first and second roller assemblies being oppositely disposed from one another with respect to the hinge point between said central panel assembly and said wire feed module assembly, said roller assemblies engaging said track to maintain the electrode of said welding torch in proper relation to the work area;
    drive means including a driven sprocket gear carried by said welding machine for engaging a roller chain attached to said track for driving said welding machine assembly at a controllable rate along said track extending along said workpiece adjacent the work area;
    control means for selectively engaging said sprocket gear with said roller chain to control movement of said welding machine assembly relative to said track; and
    radius adjustment means connected between said central panel assembly and said wire feed module assembly for adjusting the effective radius of said welding machine assembly to correspond with the radius of said track.

2. The welding machine assembly of claim 1, wherein said drive means includes a first motor connected for driving said sprocket gear, and said wire feed module assembly includes a wire feed mechanism affixed to said wire feed module assembly and a second motor connected to said wire feed mechanism for providing welding wire to said welding torch at a controllable rate.

3. The welding machine assembly of claim 1, including a wire spool affixed to said wire feed module assembly for containing a supply of welding wire on a wire reel proximate the welding operation.

4. The welding machine assembly of claim 3, wherein said wire spool includes:
    a plurality of wire spool shoes disposed about the circumference of said wire spool for receiving a wire reel having a supply of welding wire contained thereon;
    an adjustment cam disposed at a joinder point between two of said wire spool shoes for changing the circumferential dimension of said shoes; and
    a locking cam disposed at a second joinder point between said two wire spool shoes for providing a positive lock between said wire spool and said wire spool shoes.

5. The welding machine assembly of claim 1, wherein said radius adjustment means includes a gusset having a plurality of spaced apart detents therein, each of said detents corresponding to a desired radius of said welding machine assembly, and a pin biased toward said gusset for engaging said detents as said detents are aligned with said pin.

6. A welding machine assembly for joining the abutting ends of substantially vertically extending cylindrical workpieces in end-to-end relation, comprising:
    a central panel assembly including a welding torch and a torch adjustment means for receiving said torch and adjusting the position of said torch relative to a work area;
    a wire feed module assembly hingedly connected to and adjacent said central panel assembly, said wire feed module assembly including a wire spool adapted to receive a reel of welding wire thereon and a wire feed means for providing welding wire from said reel to said welding torch;
    a first roller assembly affixed to said wire feed module assembly for engaging a cylindrical track affixed to a first substantially vertically extending cylindrical workpiece or pipe section and adjacent the work area;
    a second roller assembly affixed to said central panel assembly for engaging said track, said first and second roller assemblies being oppositely disposed from one another with respect to the hinge point between said central panel assembly and said wire feed module assembly, said roller assemblies engaging said track to maintain the electrode of said welding torch in a predetermined relation to the work area;
    drive means including a driven sprocket gear carried by said central panel assembly for engaging a roller chain attached to said track to drive said welding machine assembly along said track;

control means for selectively engaging said sprocket gear with said roller chain to control movement of said welding torch along the work area; and radius adjustment means connected between said central panel assembly and said wire feed module assembly for adjusting the effective radius of said welding machine assembly to correspond with the radius of said track.

7. The welding machine assembly of claim 6, wherein said radius adjustment means includes a gusset having a plurality of spaced apart detents therein, each of said detents corresponding to a desired radius of said welding machine assembly, and a pin biased toward said gusset for engaging said detents as said detents are aligned with said pin.

8. The welding machine assembly of claim 7, wherein said gusset is connected to said wire feed module assembly and said pin is carried by said central panel assembly.

9. The welding machine assembly of claim 6, wherein said torch adjustment means provides for movement of said welding torch in two planes substantially perpendicular one to the other.

10. The welding machine assembly of claim 6, wherein said wire spool includes a plurality of wire spool shoes disposed about the external circumference of said wire spool for engaging said wire reel.

11. The welding machine assembly of claim 10, further including locking and adjustment cams disposed adjacent radially extending end surfaces of said wire spool shoes for altering the external circumferential dimension of said wire spool.

* * * * *